United States Patent
Yuuki

(10) Patent No.: US 7,186,037 B2
(45) Date of Patent: Mar. 6, 2007

(54) OPTICAL ACTIVE CONNECTOR

(75) Inventor: Hayato Yuuki, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 196 days.

(21) Appl. No.: 10/960,000

(22) Filed: Oct. 8, 2004

(65) Prior Publication Data
US 2005/0078917 A1  Apr. 14, 2005

(30) Foreign Application Priority Data
Oct. 9, 2003  (JP) .............................. 2003-350984

(51) Int. Cl.
*G02B 6/42* (2006.01)
(52) U.S. Cl. .......................................... 385/92; 385/88
(58) Field of Classification Search ............ 385/88–94
See application file for complete search history.

(56) References Cited

U.S. PATENT DOCUMENTS 4,307,934 A * 12/1981 Palmer ........................ 385/93
2002/0141706 A1 * 10/2002 Nakura et al. ................ 385/53
2005/0135758 A1 * 6/2005 Sato et al. .................... 385/92

FOREIGN PATENT DOCUMENTS

| JP | A 11-142694 | 5/1999 |
|---|---|---|
| WO | 02/12941 A2 | 2/2002 |

\* cited by examiner

Primary Examiner—Michelle Connelly-Cushwa
(74) Attorney, Agent, or Firm—Oliff & Berridge, PLC

(57) ABSTRACT

An electric connector portion, an optical element and a mounting board formed with a circuit executing a predetermined signal conversion and relay processing are held by a case. The case includes an optical element-containing recessed portion having electrical conductivity, and the optical element is arranged in the optical element-containing recessed portion. Further, the case may include a mounting part-containing recessed portion independently from the optical element-containing recessed portion, and mounting parts on the mounting board may be arranged in the mounting part-containing recessed portion.

14 Claims, 2 Drawing Sheets

OPTICAL ACTIVE CONNECTOR

The disclosure of Japanese Patent Application No. JP2003-350984 is incorporated herein by reference in its entirety.

BACKGROUND OF THE INVENTION

1. Field of Invention

The present invention relates to a technology of an optical active connector, particularly useful for high speed optical communication in, for example, a vehicular optical communication system.

2. Description of Related Art

In general civil apparatus, there is known an optical active connector (integrated type plug) integrated with an interface for an electric cable, an interface for an optical fiber or an interface with a photoelectric conversion unit.

Such an optical active connector is interposed between an electric apparatus and an optical fiber cable, between an electric cable and an optical fiber cable, or the like for converting between electric signals and optical signals in a communication path between predetermined electric apparatus.

Such an optical active connector is disclosed in, for example, JP-A-11-142694.

SUMMARY OF THE INVENTION

However, the above-described optical active connector is on the premise of a transmission speed of about several megabits per second and on the premise of use by a general civil apparatus, and therefore, sufficient consideration is not given to a countermeasure against electromagnetic noise that is present in use of a vehicle.

For example, in vehicular optical communication necessitating a transmission speed exceeding 100 megabits per second, electromagnetic noise emitted by a vehicle affects the surroundings, and erroneous signals are introduced by electromagnetic noise received from the surroundings. Therefore, a sufficient countermeasure against electromagnetic noise is needed. Particularly, a device that receives an optical signal by high speed communication is integrated with a circuit that converts small changes in current by receiving light into an electric signal and therefore, a countermeasure against noise from outside is important.

Hence, it is an object of the invention to provide an optical active connector capable of sufficiently shielding an electromagnetic wave.

In order to achieve the above-described object, exemplary embodiments of the invention provide an optical active connector for converting between an optical signal and an electric signal in a communication path in a vehicle. The optical active connector includes an electric connector portion for executing at least one of an input and an output of the electric signal, an optical element for executing an input or an output of the optical signal, a mounting board having a circuit for executing a predetermined signal conversion and relay processing between the electric connector portion and the optical element, and a case holding the electric connector portion, the optical element and the mounting board. The case is formed with an optical element-containing recessed portion having electrical conductivity, and the optical element is arranged in the optical element-containing recessed portion. According to this structure, an electromagnetic wave can sufficiently be shielded from leaking from the optical element to outside, or from coming from outside to the optical element.

In exemplary embodiments, the case may be formed with a mounting part-containing recessed portion having electrical conductivity, independently from the optical element-containing recessed portion, and a mounting part mounted to the mounting board may be arranged in the mounting part-containing recessed portion. According to this structure, an electromagnetic wave can sufficiently be shielded from leaking from the mounting part on the mounting board to outside, or from coming from outside to the mounting part. Further, because the optical element-containing recessed portion and the mounting part-containing recessed portion are formed independently from each other, electromagnetic shielding is achieved also between the optical element and the mounting part.

In exemplary embodiments, the mounting board may be directly fixed to the case at the inside of the case. According to this structure, forces from outside are not easily exerted directly on the mounting board.

In exemplary embodiments, an optical fiber fixing member may be included to hold an optical fiber, wherein the optical fiber fixing member is fixed to the case in a mode of optically coupling the optical element and the optical fiber in a non-contacting manner. According to this structure, even when an external force is exerted on the optical fiber, the force does not easily operate on the optical element.

In exemplary embodiments, the electric connector portion may be fixed to the case. Therefore, an external force acting on the electric connector portion is not easily exerted on the mounting board.

In exemplary embodiments, the electric connector portion and the mounting board may be electrically connected via a wiring member that is more flexible than the case. Therefore, an external force acting on the electric connector portion is not easily exerted on an electric circuit.

These and other objects, advantages and salient features of the invention are described in or apparent from the following description of exemplary embodiments.

BRIEF DESCRIPTION OF THE DRAWINGS

Exemplary embodiments of the invention will be described in connection with the drawings, wherein like numerals represent like parts, and wherein.

DETAILED DESCRIPTION OF PREFERRED EMBODIMENTS

An explanation will be given of an optical active connector according to an embodiment of the invention as follows.

Figure 1:
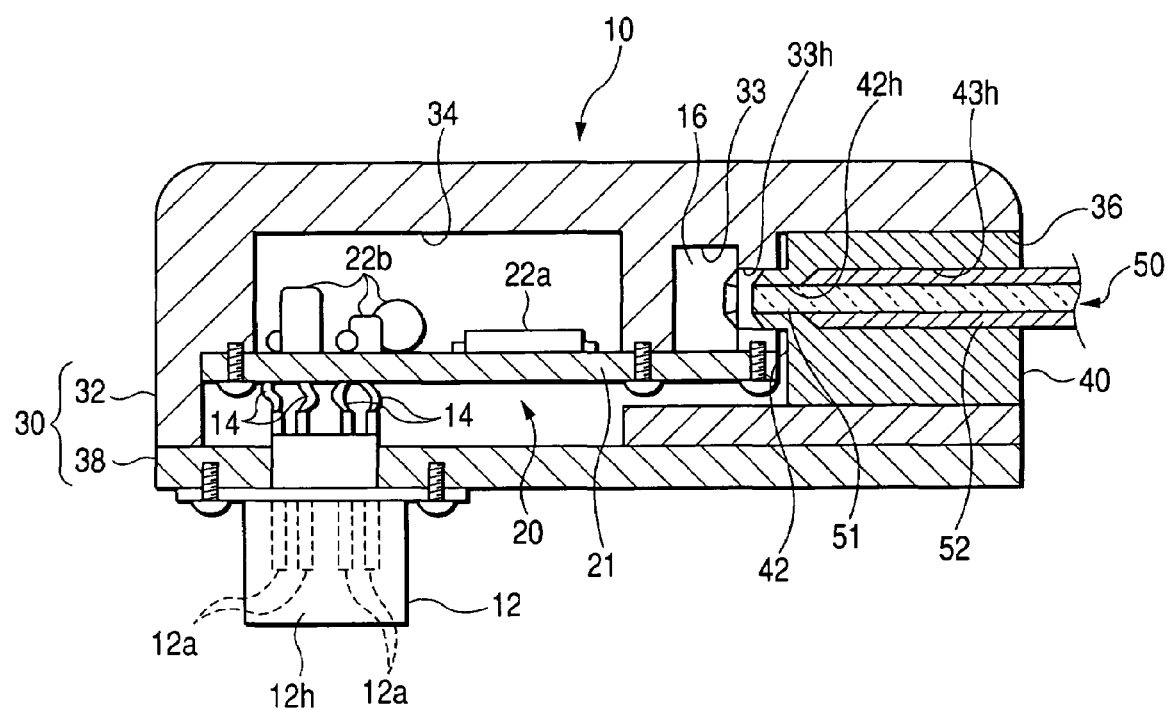
FIG. 1 is a sectional view showing an optical active connector according to an embodiment of the invention.

FIG. 1 is a sectional view showing an optical active connector. The optical active connector 10 is provided with an electric connector portion 12, an optical element 16, a mounting board 20, a case 30, and an optical fiber fixing portion 40.

The case 30 is provided with a case main body portion 32 substantially in a shape of a cabinet, one side of which is open, and a lid portion 38 closing an opening of the case main body portion 32. The case main body portion 32 and the lid portion 38 may be members made of a metal by diecasting, or shaped by any other suitable metalworking method, or may be members of an electrically conductive resin mixed with a conductive filler such as a metal filler or the like, such that, as a whole, they are electrically conductive. As an alternative, only an optical element-containing recessed portion 33 and a mounting part-containing recessed portion 34 may be members formed by a conductive material, and other parts of the case main body portion 32 and/or the lid portion 38 may be non-conductive.

Heat of the optical element 16 can be transmitted, by thermal conduction, via the case main body portion 32 if the case main body portion 32 is made of metal or another heat-conductive material. In high speed communication exceeding 100 megabits, the optical element 16 needs to be driven at high speed, and therefore the above-described constitution is effective for diverging to the outside thermal energy generated by the high-speed operation.

The case main body portion 32 is preferably formed with the optical element-containing recessed portion 33 capable of containing the optical element 16 and the mounting part-containing recessed portion 34 capable of containing mounting parts 22a, 22b above the mounting board 20 as recessed portions that are independent from each other.

The optical element-containing recessed portion 33 preferably has a shape corresponding to an outer shape of the optical element 16. Further, the optical element 16 is held at a predetermined position inside of the case main body portion 32 by arranging the optical element 16 in the optical element-containing recessed portion 33.

Further, one side wall portion of the optical element-containing recessed portion 33 is formed with a hole portion 33h communicating with a fiber fixing portion-containing recessed portion 36.

The mounting part-containing recessed portion 34 has a size corresponding to a size of a region of mounting the mounting parts 22a, 22b in the mounting board 20. Further, the mounting parts 22a, 22b mounted to the mounting board 20 are arranged to be contained in the mounting part-containing recessed portion 34 when a peripheral edge portion of the region of the mounting board 20 mounting the mounting parts 22a, 22b is fixed to a peripheral edge portion of the mounting part-containing recessed portion 34 by an attachment mechanism such as screws, or any other suitable attachment mechanism such as adhesive, plastically deformable metal pegs, or the like.

Further, the fiber fixing portion-containing recessed portion 36 capable of containing the optical fiber fixing portion 40 is formed at one end portion of the case main body portion 32 and is contiguous to the optical element-containing recessed portion 33.

One end portion of the fiber fixing portion-containing recessed portion 36 is opened to outside of the case main body portion 32. Further, at the other end portion, the fiber fixing portion-containing recessed portion 36 is in communication with the optical element-containing recessed portion 33 via the hole portion 33h, as described above.

The lid portion 38 may be formed in a shape of a flat plate capable of closing the opening of the case main body portion 32, and may be attached to the case main body portion 32 by using screwing or any other known or later-developed engaging structure.

The electric connector portion 12 may be a connector in which connector terminals 12a protrude inside of a connector housing 12h. By connecting an external connector (not shown) to the electric connector portion 12, at least one of input and output of an electric signal may be carried out.

The electric connector portion 12 may be attached to the lid portion 38 by screwing or any other suitable attachment mechanism. Further, each of the connector terminals 12a of the electric connector portion 12 may be electrically connected to a circuit formed on the mounting board 20 via a wiring member 14. The wiring member 14 is preferably more flexible than the case 30, and may be, for example, an electric wire constituted by coating a resin on the periphery of a soft copper wire or the like.

The optical element 16 is a light receiving element for converting an optical signal into an electric signal, or a light emitting element for converting an electric signal into an optical signal. The optical element 16 is mounted to the mounting board 20. By arranging the optical element 16 to be contained in the optical element-containing recessed portion 33 and attaching the mounting board 20 to the case main body portion 32, the optical element 16 is held in the case main body portion 32 at a predetermined position. Further, a light receiving face or a light emitting face of the optical element 16 faces the fiber fixing portion-containing recessed portion 36 by way of the hole portion 33h. The optical element 16 and a fiber core line portion 51, mentioned later, are optically coupled by way of the hole portion 33h.

Further, the optical element 16 may be constituted such that one of the light receiving element and the light emitting element is integrated to the connector 10, or may be constituted such that both the light receiving element and the light emitting element are integrated to the connector 10.

The mounting parts 22a, 22b mounted on the mounting board 20 may include an active element 22a of an integrated circuit (IC) or the like having a function of amplifying a signal, or processing to drive an element or the like, and other elements 22b of a resistor, a capacitor and/or the like on a predetermined printed circuit board (PCB) 21. The mounting board 20 includes circuitry for processing to amplify an electric signal, and/or for processing to convert and relay a signal, such as processing to drive the optical element 16. The circuitry makes connections as appropriate between the electric connector portion 12, the optical element 16 and the above-described mounting parts 22a, 22b or the like.

As the printed circuit board (PCB) 21, a single layer board may be used, or a multilayer board having a plurality of electrically conductive layers may be used as necessary or desired. An advantage of enhanced shielding of electromagnetic waves is achieved by using a multilayer board as described in more detail below.

The mounting board 20 may be directly fixed to a peripheral edge portion of an opening of the optical element-containing recessed portion 33 and a peripheral edge portion of an opening of the mounting part-containing recessed portion 34 of the case main body portion 32 by screwing or another appropriate attachment mechanism.

The optical fiber fixing portion 40 is a member for holding the optical fiber cable 50, and fits inside of the fiber fixing portion-containing recessed portion 36.

More specifically, the optical fiber fixing portion 40 may be provided with a block-like shape capable of being inserted into the fiber fixing portion-containing recessed portion 36, and a cylindrical portion 42 may be formed at one side face thereof.

The cylindrical portion 42 has an outer diameter dimension corresponding to an inner diameter dimension of the hole portion 33h. A front end portion, i.e., the left end portion in FIG. 1, of an outer periphery of the cylindrical portion 42 is formed in a tapered shape such that its diameter successively narrows in a direction of the front end. The cylindrical portion 42 is made to be able to inserted into the hole portion 33h.

Further, inside of the cylindrical portion 42 is formed a fiber holding hole 42h capable of holding the fiber core line portion 51 of the optical fiber cable 50 along an axial direction thereof. Further, a cable holding hole 43h capable of holding a cable cover portion 52 of the optical fiber cable 50 is formed to be continuous with the fiber holding hole 42h at a rear side of the fiber holding hole 42h.

Further, the optical fiber cable 50 may be arranged in the optical fiber fitting portion 40 as follows. First, the cable cover portion 52 is stripped off from a front end side of the optical fiber cable 50 over a predetermined dimension to expose the fiber core line portion 51. Next, the optical fiber cable 50 is inserted from the cable holding hole 43h into the fiber holding hole 42h, the fiber core line portion 51 is arranged inside the fiber holding hole 42h and the cable cover portion 52 is arranged inside the cable holding hole 43h. Thereafter, the optical fiber cable 50 is fixed within the optical fiber fixing portion 40 by using a stopper (not illustrated), or using an adhering agent or the like. Further, an end portion of the fiber core line portion 51 slightly projected from the cylindrical portion 42 is subjected to mirror finish processing. Thereby, operation of fixing the optical fiber cable 50 within the optical fiber fixing portion 40 is finished.

The fiber fixing portion 40 holding the optical fiber cable 50 in this way may be arranged within the fiber fixing portion-containing recessed portion 36 in the following manner.

That is, the optical fiber fixing portion 40 is inserted into the fiber fixing portion-containing recessed portion 36 from the open end thereof. Further, the cylindrical portion 42 is inserted into the hole portion 33h. At this occasion, the cylindrical portion 42 may be arranged at a position at which the fiber core line portion 51 at the front end of the cylindrical portion 42 is arranged at a position separated from the light receiving face or the light emitting face of the optical element 16 by a predetermined distance. That is, the cylindrical portion 42 may be arranged in a positional relationship in which the optical element 16 and the fiber core line portion 51 are optically coupled in a non-contacting manner. According to the depicted embodiment, further, the optical fiber fixing portion 40 is arranged such that the optical fiber fixing portion 40 is not in contact with the wall portion that divides the optical element-containing recessed portion 33 and the fiber fixing portion-containing recessed portion 36.

In this state, the optical fiber fixing portion 40 may be fixed to the case main body portion 32 by screwing, by an adhering agent, or by any other suitable attachment mechanism.

Figure 2:
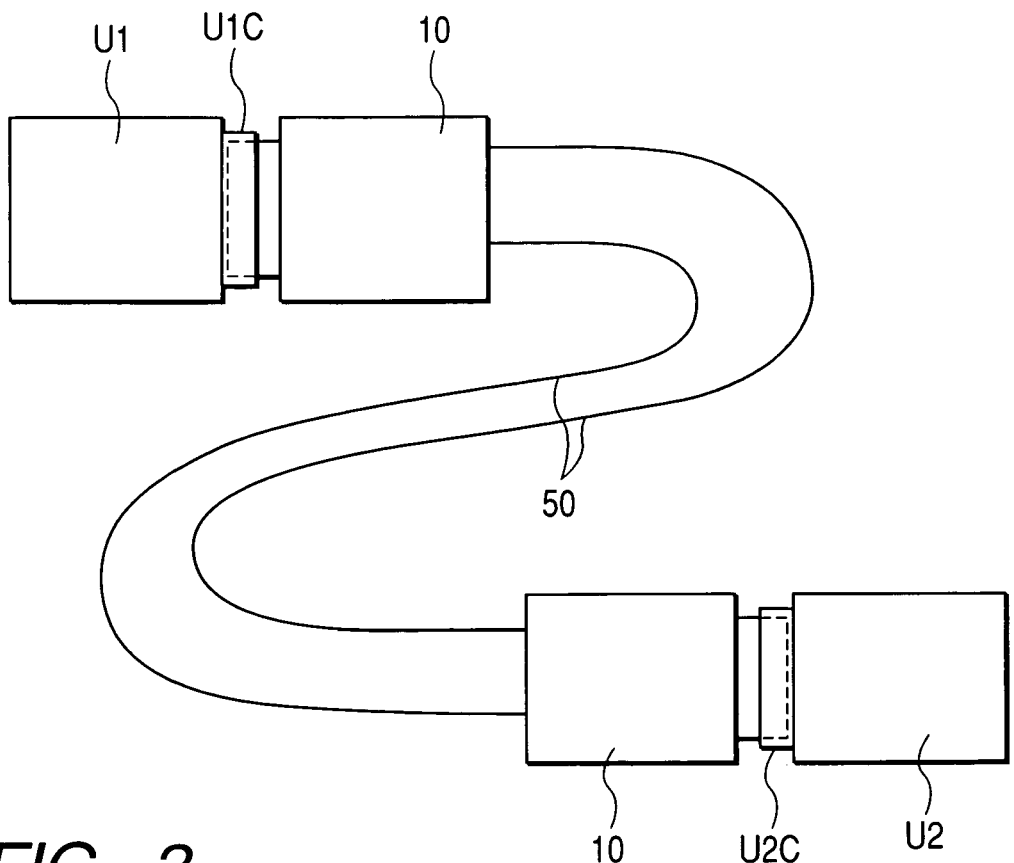
FIG. 2 is a view for explaining an example of using the optical active connector of FIG. 1.

An explanation will be given of an example of using the optical active connector 10, with reference to FIG. 2. Here, an explanation will be given of an example of providing the optical active connector 10 at an end portion of a communication path.

First, there is prepared a structure in which both end portions of an optical fiber cable 50 are respectively connected with optical active connectors 10.

Further, an electric connector U1C provided to an electronic unit U1 (electronic apparatus) mounted to a vehicle and the optical active connector 10 on one side are connected. Further, an electric connector U2C provided to another electronic unit U2 (electronic apparatus) mounted to the vehicle and the optical active connector 10 on the other side are connected. Thereby, an electric signal transmitted from the electronic unit U1 or U2 on one side is converted into an optical signal at the optical active connector 10 on one side, and thereafter conducted through the optical fiber cable 50 to be converted from the optical signal into an electric signal at the optical active connector 10 on the other side. The thus-converted signal is then transmitted to the electronic unit U2 or U1 on the other side. Therefore, an optical communication path using the optical fiber cable 50 is applicable to the communication path connecting the electronic unit U1 having the electric connector U1C and the electronic unit U2 having the electric connector U2C.

Figure 3:
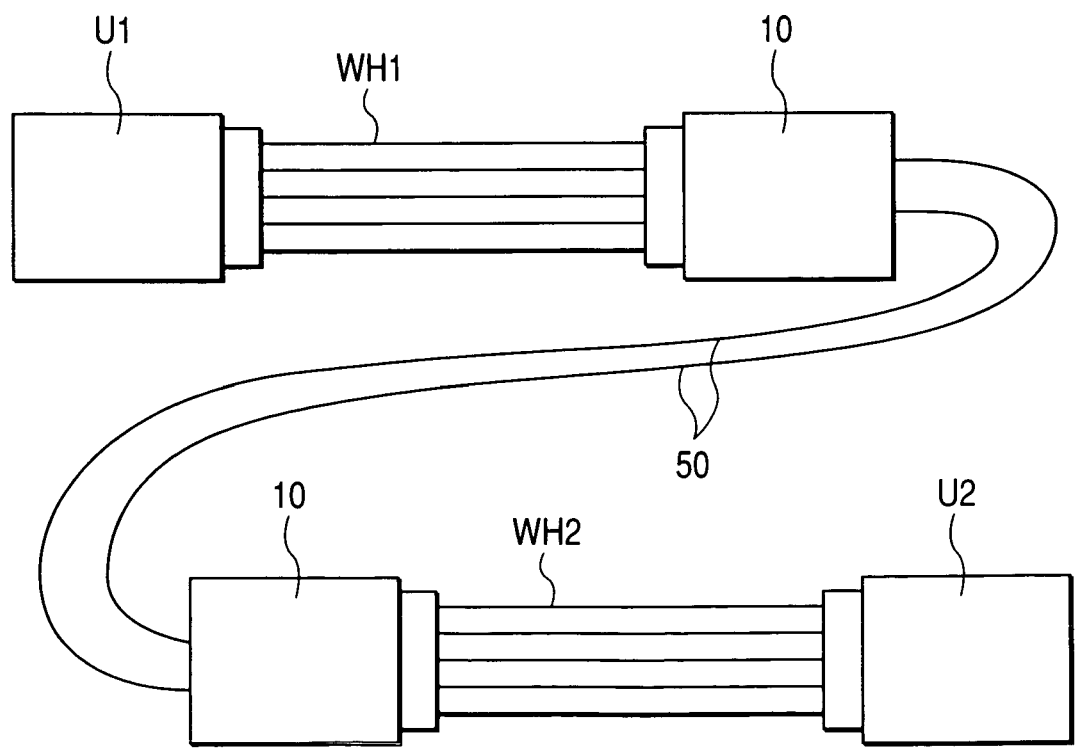
FIG. 3 is a view for explaining another example of using the optical active connector of FIG. 1.

An explanation will be given of another example of using the optical active connector 10, with reference to FIG. 3. Here, an explanation will be given of an example of interposing optical active connectors 10 between wire harnesses WH1, WH2 and the optical fiber cable 50 at a middle of a communication path.

First, there is prepared a structure in which both end portions of the optical fiber cable 50 are respectively connected with optical active connectors 10.

Further, for example, in the communication path between the electronic unit U1 and the electronic unit U2 in a vehicle, an electric connector at an end portion of the wire harness WH1 led from the electronic unit U1 and the optical active connector 10 on one side are connected. Further, an electric connector at an end portion of the wire harness WH2 led from the electronic unit U2 and the optical active connector 10 on the other side are connected. Thereby, an electric signal transmitted from the electronic unit U1 or U2 on one side is conducted through the wire harness WH1 or WH2, converted into an optical signal at the optical active connector 10 on one side, and thereafter conducted through the optical fiber cable 50 and converted from the optical signal into an electric signal at the optical active connector 10 on the other side. The thus-converted signal is then conducted through the wire harness WH2 or WH1 and transmitted to the electronic unit U2 or U1 on the other side. Therefore, in the communication path, the electric communication paths using the wire harnesses WH1, WH2 and the optical communication path using the optical fiber cable 50 can efficiently be used properly in accordance with respective characteristics thereof.

According to the optical active connector 10 constituted as described above, the case 30 is formed with the optical element-containing recessed portion 33 having electrical conductivity, and the optical element 16 is arranged within the-optical element-containing recessed portion 33. Therefore, an electromagnetic wave can sufficiently be shielded from leaking from the optical element 16 to outside, or from coming from outside to the optical element 16.

Further, the mounting part-containing recessed portion 34 having electrical conductivity is formed independently from the optical element-containing recessed portion 33, and the mounting parts 22a, 22b mounted to the mounting board 20 are arranged inside the mounting part-containing recessed portion 34. Therefore, an electromagnetic wave can sufficiently be shielded from leaking from the mounting parts 22a, 22b on the mounting board 20 to outside, or from coming from outside to the mounting parts 22a, 22b. Further, because the optical element-containing recessed portion 33 and the mounting part-containing recessed portion 34 are formed independently from each other, an interval between the optical element 16 and the mounting parts 22a, 22b is electromagnetically shielded.

Particularly, by using a multilayer wiring board as the printed circuit board 21, a shielding structure entirely surrounding the mounting parts 22a, 22b and/or the optical element 16 can be realized by the optical element-containing recessed portion 33, or a combination of the optical element-containing recessed portion 33 and a metallic foil, such as a copper foil, at a predetermined layer of the multilayer wiring board.

Further, because the mounting board 20 may be fixed directly to the case 30 at an inside portion of the case 30, a force from outside is not easily directly exerted on the mounting board 20. Therefore, stresses are not easily applied between the mounting board 20 and the optical element 16, and electric contact failure caused by exfoliating solder between the optical element 16 and the like and the mounting board 20 can effectively be reduced.

Further, because the optical element 16 and the fiber core line portion 51 may be optically coupled in a non-contacting manner, even when a sudden external force is exerted on the optical fiber cable 50 in assembling harnesses or integrating harnesses to the vehicle or the like, the force is not easily transmitted to the optical element 16. Thereby, electric contact failure caused by exfoliating solder between the optical element 16 and the mounting board 20 can effectively be reduced.

Particularly, according to the depicted embodiment, the optical fiber fixing portion 40 is arranged such that the optical fiber fixing portion 40 is not in contact with the wall portion that divides the optical element-containing recessed portion 33 and the fiber fixing portion-containing recessed portion 36. Therefore, even when a force for pushing the optical fiber fixing portion 40 into the case 30 is exerted, the force is not easily transmitted from the optical element-containing recessed portion 33 to the optical element 16 and electric contact failure between the optical element 16 and the mounting board 20 can effectively be reduced also in this respect.

Further, because the electric connector portion 12 may be attached to the case 30 without being attached to the mounting board 20, an external force acting on the electric connector portion 12 is not easily transmitted to the mounting board 20. Further, because the electric connector portion 12 and the mounting board 20 may be electrically connected via the wiring member 14 that is more flexible than the case 30, there can also be avoided a situation in which an external force acting on the electric connector portion 12 is transmitted to the mounting board 20 via the wiring member 14.

As a result of making a force from outside difficult to conduct to the mounting board 20 in this way, stresses are not easily applied between the mounting board 20 and the optical element 16, and electric contact failure caused by exfoliating solder between the optical element 16 or the like and the mounting board 20 can effectively be reduced.

Particularly, when the optical active connector 10 is directly connected to the electronic units U1, U2, the optical active connector 10 is easily subjected to a load or influence of an electromagnetic wave from the electronic unit U1, U2, and therefore, a structure that shields an electromagnetic wave and/or that prevents or reduces an external force from being exerted to the inside as described above is very useful.

While the invention has been described with reference to specific embodiments, these embodiments should be viewed as illustrative and not limiting. Various modifications, improvements and/or substitutes are possible within the spirit and scope of the invention.

What is claimed is:

1. An optical active connector, comprising:
   an electric connector portion that enables at least one of an input and an output of an electric signal;
   an optical element that enables at least one of an input and an output of an optical signal;
   a mounting board including circuitry that executes predetermined signal conversion and relay processing between the electric connector portion and the optical element; and
   a case that holds the electric connector portion, the optical element and the mounting board, comprising:
   an optical element-containing recessed portion, made of a material having electrical conductivity that houses the optical element;
   a mounting part-containing recessed portion, made of a material having electrical conductivity and separate from the optical element-containing recessed portion;
   wherein securing the mounting board including circuitry to the case, the mounting part-containing recessed portion is enclosed from other portions of the case, the optical element-containing recessed portion is enclosed from other portions of the case, and one or more electrical components mounted on the mounting board are contained within the enclosed mounting part-containing recessed portion.

2. The optical active connector according to claim 1, wherein the mounting board comprises a multilayer wiring board including a layer of electrically conductive material,
   wherein upon securing the mounting board including circuitry to the case the optical element enclosed within the optical element-containing recessed portion is substantially entirely surrounded by electrically conductive material and the one or more electrical components enclosed within the mounting part-containing recessed portion are substantially entirely surrounded by electrically conductive material.

3. The optical active connector according to claim 2, wherein the layer of electrically conductive material is a metallic foil.

4. The optical active connector according to claim 3, wherein the metallic foil is a copper foil.

5. The optical active connector according to claim 1, wherein the mounting part-containing recessed portion has electrical conductivity that is independent from the electrical conductivity of the optical element-containing recessed portion.

6. The optical active connector according to claim 1, wherein the mounting board is directly fixed to the case at an interior portion of the case.

7. The optical active connector according to claim 1, further comprising:
   an optical fiber fixing portion that holds an optical fiber;
   wherein the optical fiber fixing portion is fixed to the case, with the optical element and the optical fiber being optically coupled but not in contact with each other.

8. The optical active connector according to claim 7, further comprising:
   a fiber fixing portion-containing recessed portion that receives the optical fiber fixing portion; and
   a wall portion that separates the optical element-containing recessed portion and the fiber fixing portion-containing recessed portion;
   wherein the optical fiber fixing portion is arranged to be not in contact with the wall portion.

9. The optical active connector according to claim 1, wherein the electric connector portion is attached to the case.

10. The optical active connector according to claim 9, wherein the electric connector portion and the mounting board are electrically connected via a wiring member that is more flexible than the case.

11. A communication path, including the optical active connector according to claim 1 at an end portion of the communication path.

12. A vehicle, including the communication path according to claim 1.

13. A communication path, including the optical active connector according to claim 1 at a middle portion of the communication path.

14. A vehicle, including the communication path according to claim 13.

* * * * *